J. M. LANSDEN.
MOTOR VEHICLE AND AXLE THEREFOR.
APPLICATION FILED DEC. 2, 1918.

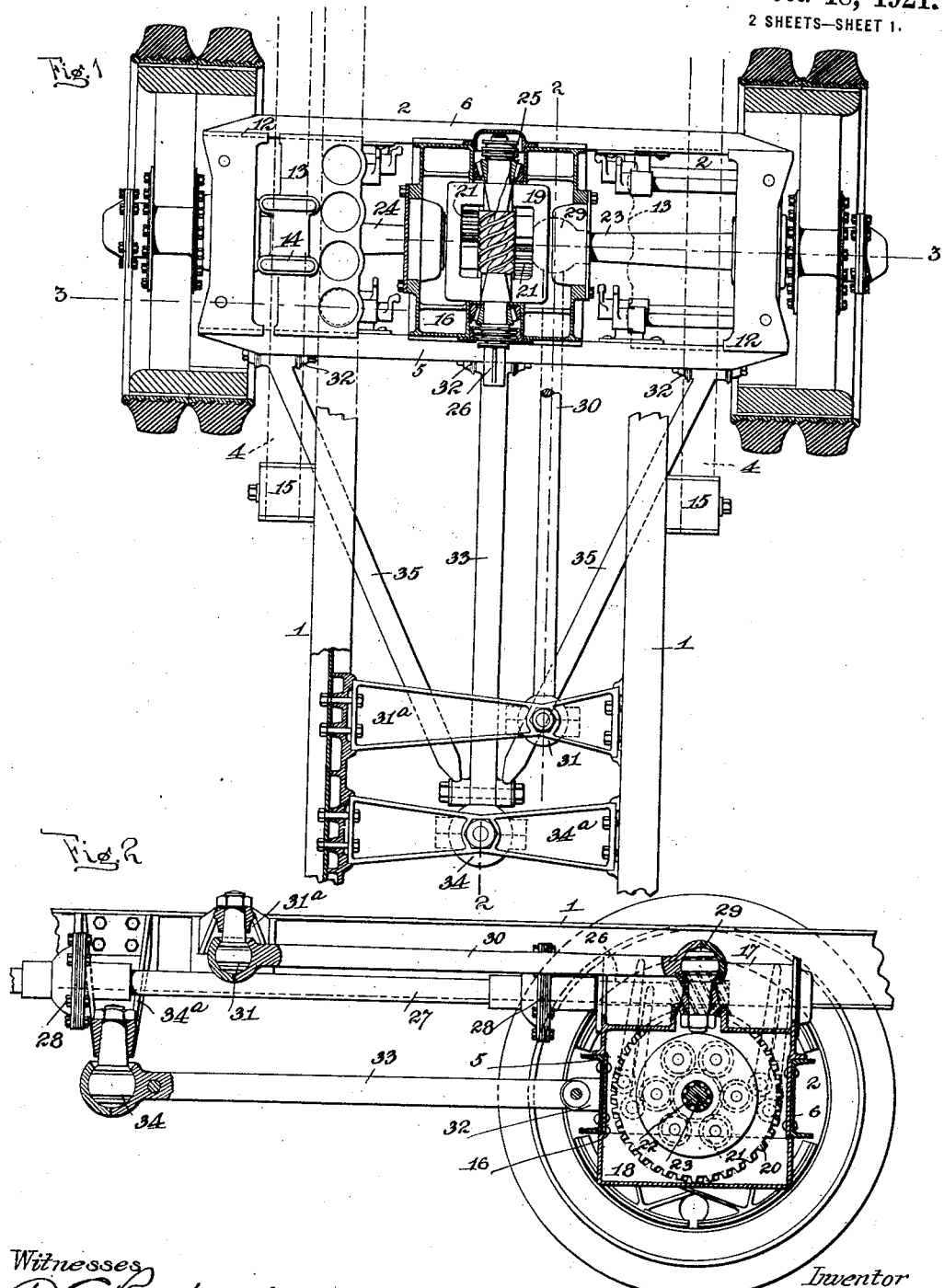

1,394,099.

Patented Oct. 18, 1921.
2 SHEETS—SHEET 2.

Witnesses

Inventor
John M. Lansden

UNITED STATES PATENT OFFICE.

JOHN M. LANSDEN, OF NEW YORK, N. Y.

MOTOR-VEHICLE AND AXLE THEREFOR.

1,394,099.  Specification of Letters Patent.  Patented Oct. 18, 1921.

Application filed December 2, 1918. Serial No. 264,890.

*To all whom it may concern:*

Be it known that I, JOHN M. LANSDEN, a citizen of the United States, and a resident of the borough of Manhattan, city, county, and State of New York, have invented a certain new and useful Motor-Vehicle and Axle Therefor, of which the following is a specification.

My invention relates to driving or power axles for motor vehicles and particularly to axles of the "live" type, and has for its object to produce such an axle of simple construction, great strength and rigidity and of a minimum weight.

A further object is to provide a construction wherein the parts are readily accessible for inspection and repair.

A further object is to provide means for securing the axle in fixed relation to the chassis frame while permitting freedom of movement of the axle.

Another object is to so construct and proportion the parts as to permit the axle to move relatively to the chassis frame except in the direction longitudinally of the frame.

These and further objects will more fully appear in the following specification and accompanying drawings considered together or separately.

I have illustrated one embodiment of my invention in the accompanying drawings in which corresponding parts in all of the figures are designated by similar characters of reference, and in which—

Figure 1 is a plan view, partly in section of a portion of the chassis frame of a vehicle embodying my invention.

Fig. 2 is a longitudinal sectional view on the line 2—2 of Fig. 1.

Figure 3:
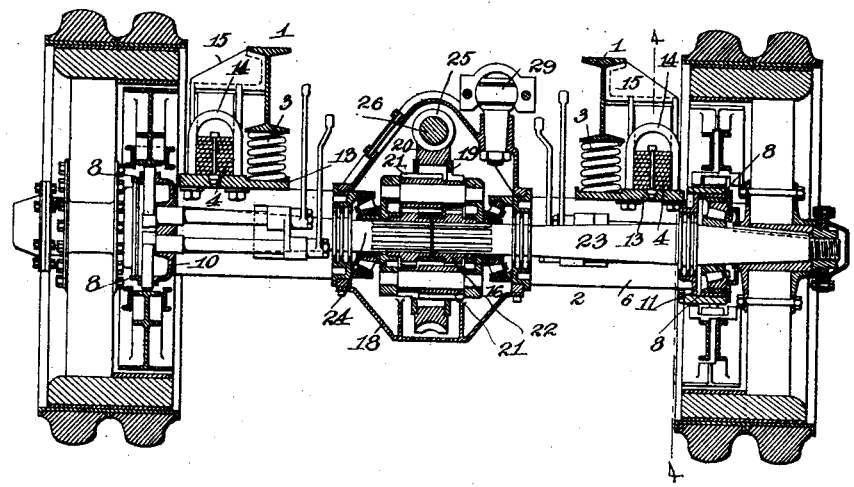
Fig. 3 is a transverse section on the line 3—3 of Fig. 1.
Figure 4:
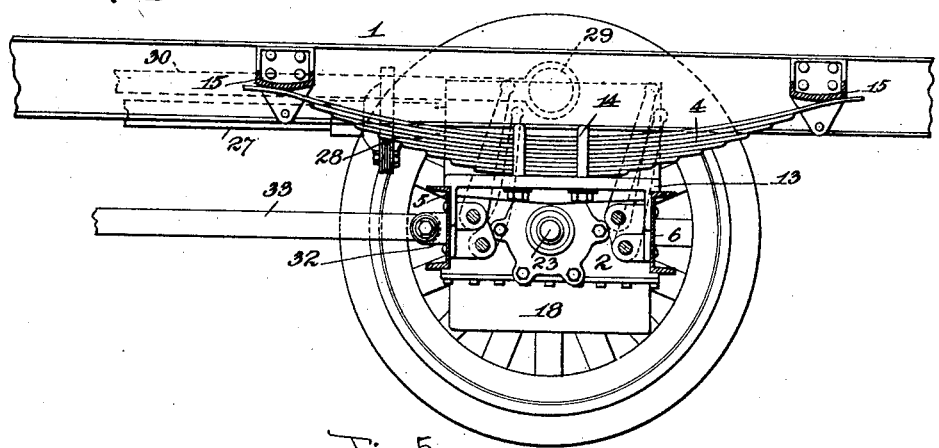
Fig. 4 is a detail sectional view taken on the line 4—4 of Fig. 3.
Figure 5:
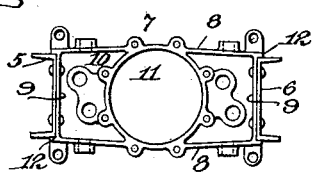
Fig. 5 is a detail elevation of an end cap.

In carrying out my invention I provide a chassis frame comprising longitudinal I-beams 1 which are connected together by transverse members as is common. The rear end of the frame is supported by an axle 2 through the intermediary of coil springs 3 and semi-elliptic leaf springs 4. The frame rests upon the springs 3 and 4 and has no connection with them save the force of gravity.

The axle comprises two channel beams 5 and 6 spaced apart in parallel arrangement with their flanges extending in opposite directions or outwardly relatively to the axle. The ends of the beams 5 and 6 are secured in their spaced relation by box-like caps 7, each of which comprises top and bottom members 8, end members 9, by means of which the cap is secured to the beams 5 and 6, and a side member 10. A tubular member 11 extends through the cap from side to side for a purpose to be hereinafter described. Flanges 12 on the ends of the cap engage the top and bottom of each beam and give additional support for the caps.

A plate 13 spans the beams in proximity to each end cap. The spiral springs 3 rest in sockets in the plates 13 and bear against the lower flanges of the frame beams 1. The leaf springs 4 are each secured at its center to a plate 13 by means of clips 14 and each free end of each spring 4 bears against the lower, convex face of a bracket 15 secured to the web of the beam 1 adjacent the spring. The convex face of each bracket is of a length and curvature properly proportioned to the length and curvature of the semi-elliptic spring and to the load which the spring is designed to carry.

Rigidly secured between the beams 5 and 6 and at the centers thereof is a differential casing 16 comprising a rectangular box open at top and bottom. The top is inclosed by a cover 17 and the bottom by a base 18 each removably secured in position. Within the casing 16 is carried a spur differential comprising a housing 19 carrying a worm wheel 20 and a plurality of spur pinions 21. The pinions on one side of the center are in mesh with a master gear 22 rotating with one member 23 of the live axle shaft. The pinions on the opposite side of the center line mesh with a similar master gear on the other member 24 of the axle shaft. The worm wheel 20 is engaged by a worm 25 fast on a shaft section 26 mounted in bearings in the cover 17.

The shaft section 26 is secured to a section 27 of a propeller shaft which extends from the engine (not shown) to the differential. The propeller shaft which includes the section 26, is composed of sections which are coupled together by flexible couplings 28 which will permit the shaft to function properly when its members are out of axial alinement. The coupling is not claimed herein but is included in a copending application for patent.

Formed in the cover 17 is a tapered bearing in which is secured the tapered stem of the stationary member of a ball and socket joint 29, the rotatively movable member of which is carried at one end of a torque rod 30 which extends forward, and the opposite end of which carries the movable member of a universal joint 31 the fixed element of which is carried in an upwardly bowed element 31ª which extends transversely of the frame, and is secured to the longitudinal members thereof. For mechanical reasons I have shown the rod as arranged to one side of the longitudinal center of the chassis frame but it will be understood that the same may lie in such center line either above or below the shaft section 27.

Carried by the axle beam 5 is a plurality, preferably three, bearing brackets 32 in which are journaled the rear end of a triangular driving and alining device comprising three bars the center one 33 of which extends longitudinally of the frame in the center line thereof, and carries at its forward end the movable member of a universal joint 34, the stationary element of which is carried by a downwardly bowed element 34ª arranged transversely of the frame and rigidly secured to the longitudinal beams 1.

The side members 35 of the thrust device are journaled in the brackets 32 near the ends of the beam 5 and converge toward the bar 33 and are secured thereto near the joint 34. The thrust member 33—35 is preferably arranged in line with the horizontal center of the axle 2.

The shaft section 26, the torque rod 30 and the driving device 33—35 are of the same length, are erected in parallel planes, and their front and rear pivotal points respectively are adjacent each other whereby when the axle is moved toward or away from the chassis frame, due to road inequalities and load, and by reason of the elasticity of the springs, the movements of the elements referred to will be equal, and strains and stresses will be equally distributed. Furthermore the fact that the elements above described are arranged as stated, they will always and under all conditions of use, be parallel one to the other which will further promote easy riding of the vehicle and thereby reduce wear and tear.

Each of the live axle shafts 23 and 24 has secured, by means of a spline or otherwise, to its outer extremity a driving wheel. This wheel is illustrated as of the double tire type, and carried within its boundaries is a brake mechanism which is operated by devices carried by the beams 5 and 6 and the end caps 7. The bearings of the outer extremities of the axle shaft-members are of the roller type and are carried within the tubular portions 11 of the end caps. The bearing members are removably secured in position, as are the wheels. The wheels may be readily removed from the axle, and the shafts 23 and 24 may be disconnected from the differential and from the wheels.

The axle is an open structure and all of the elements carried thereby are readily accessible for purposes of replacement and repair. The axle and all of its appurtenances may be removed from the chassis frame by the removal of two nuts at the universal joints 31 and 34, and of one joint 28 in the propeller shaft.

The torque rod 30 while permitting the axle to pivot and turn more or less in a plane perpendicular to the longitudinal center of the frame will prevent the axle from rolling in the direction of the rotation of the wheels. The tractive efforts of the wheels will be transmitted to the longitudinal center line of the frame and thence equally to the entire frame and to the body of the vehicle. The pivotal connections of the element 33—35 and the rod 30 with the axle and the frame, and the flexible connections in the propeller shaft, will permit the extreme flexibility of the axle, and wear on the transmission, bearings, wheels and tires will be greatly reduced.

It is to be understood that the box 16 may carry a transmission device other than a differential. Any mechanism for transmitting the movement of the propeller shaft to the live axle shaft or shafts may be substituted for the differential gearing illustrated.

In accordance with the provisions of the patent statutes, I have described the principle of my invention, together with the apparatus which I now consider to represent the best embodiment thereof; but I desire to have it understood that the apparatus shown is merely illustrative and that the invention may be carried out in other ways.

Having now described my invention what I claim as new and desire to secure by Letters Patent, is:

1. A power axle for motor vehicles comprising a rectangular frame having two oppositely disposed side members and two end members only, a plurality of alined axle shafts carried in the end members of the frame, and a wheel carried by each axle shaft.

2. A power axle for motor vehicles comprising a rectangular frame having two oppositely disposed side members and two end members only, an element carried by the frame at its center, a plurality of alined axle shafts carried in the center and end members of the frame and a wheel carried by each axle shaft.

3. An axle for a motor vehicle comprising two longitudinal and two transverse members, an element carried by the longitudinal members at the centers thereof, a differential gear within the element, two shaft sections each having a bearing in the element and in a transverse member, and a wheel carried on each shaft section in proximity to a transverse member.

4. An axle for a motor vehicle comprising longitudinal and transverse members, an element carried by the longitudinal members at the centers thereof, a differential gear within the element, a drive shaft for the differential, a propeller shaft, two shaft sections each having a bearing in the element and a transverse member, a wheel carried on each shaft section in proximity to a transverse member, and a flexible connection between the drive shaft and the propeller shaft.

5. An axle for a motor vehicle comprising longitudinal and transverse members, a plate carried by the longitudinal members in proximity to the transverse members, a leaf spring secured to each plate, said springs engaging the chassis frame of the vehicle, an element carried by the longitudinal members at the centers thereof, a differential gear within the element, a drive shaft for the differential, a propeller shaft, two shaft sections each having a bearing in the element and a transverse member, a wheel carried on each shaft section in proximity to a transverse member, and a flexible connection between the drive shaft and the propeller shaft.

6. An axle for a motor vehicle comprising longitudinal and transverse members, a plate carried by the longitudinal members in proximity to a transverse member, a leaf spring secured to each plate, said springs engaging the chassis frame of the vehicle. spiral springs interposed between said plates and said chassis frame, an element carried by the longitudinal members at the centers thereof, a differential gear within the element, a drive shaft for the differential, a propeller shaft, two shaft sections each having a bearing in the element and a transverse member, a wheel carried on each shaft section in proximity to a transverse member, and a flexible connection between the drive shaft of the differential and the propeller shaft of the vehicle.

This specification signed and witnessed this 21st day of November, 1918.

JOHN M. LANSDEN.

Witnesses:
 A. E. RENTON,
 ABRAHAM FASTON.